United States Patent
Niu et al.

(10) Patent No.: US 12,182,665 B2
(45) Date of Patent: Dec. 31, 2024

(54) CHARACTERIZATION OF TIME-CORRELATED QUANTUM ERRORS THROUGH ENTANGLEMENT

(71) Applicant: Google LLC, Mountain View, CA (US)

(72) Inventors: Yuezhen Niu, Mountain View, CA (US); Trevor Johnathan McCourt, Mountain View, CA (US); Masoud Mohseni, Mountain View, CA (US); Vadim Smelyanskiy, Mountain View, CA (US)

(73) Assignee: Google LLC, Mountain View, CA (US)

(*) Notice: Subject to any disclaimer, the term of this patent is extended or adjusted under 35 U.S.C. 154(b) by 37 days.

(21) Appl. No.: 17/928,349

(22) PCT Filed: May 27, 2021

(86) PCT No.: PCT/US2021/034616
§ 371 (c)(1),
(2) Date: Nov. 29, 2022

(87) PCT Pub. No.: WO2021/243079
PCT Pub. Date: Dec. 2, 2021

(65) Prior Publication Data
US 2023/0359923 A1    Nov. 9, 2023

Related U.S. Application Data

(60) Provisional application No. 63/032,459, filed on May 29, 2020.

(51) Int. Cl.
*G06N 10/70* (2022.01)
*G06N 10/40* (2022.01)
*G06N 10/20* (2022.01)

(52) U.S. Cl.
CPC ............ *G06N 10/70* (2022.01); *G06N 10/40* (2022.01); *G06N 10/20* (2022.01)

(58) Field of Classification Search
CPC ............................... G06N 10/70; G06N 10/40
See application file for complete search history.

(56) References Cited

U.S. PATENT DOCUMENTS

2010/0251049 A1* 9/2010 Goto ............... H04L 9/0858
                                                    714/E11.032
2018/0314969 A1* 11/2018 Thornton ............ G06N 10/00
(Continued)

FOREIGN PATENT DOCUMENTS

WO    WO 2021243079    12/2021

OTHER PUBLICATIONS

Yi-Han Luo, Ming-Cheng Chen, Manuel Erhard, Han-Sen Zhong, Dian Wu, Hao-Yang Tang, Qi Zhao, Xi-Lin Wang, Keisuke Fujii, Li Li, Nai-Le Liu, Kae Nemoto, William J. Munro, Chao-Yang Lu, . . . ; Quantum teleportation of physical qubits into logical code-spaces; arXiv:2009.06242v1 [quant-ph]; Sep. 14, 2020. (Year: 2020).*
(Continued)

*Primary Examiner* — Joseph D Torres
(74) *Attorney, Agent, or Firm* — Fish & Richardson P.C.

(57) ABSTRACT

Errors that affect a quantum computer can be efficiently measured and characterized by placing the quantum computer in a highly-entangled state such as a Greenberger-Horne-Zeilinger (GHZ) state, accumulating quantum errors in the highly entangled state, and then measuring the accumulated errors. In some approaches, the error characterization includes measuring parity oscillations of the GHZ state and fitting a quantum error model to a power spectrum of the parity oscillations. The fitted quantum error model can be
(Continued)

used to select a suitable fault-tolerant error correction scheme for the quantum computer given its environmental noise.

18 Claims, 5 Drawing Sheets

(56) References Cited

U.S. PATENT DOCUMENTS

| | | | |
|---|---|---|---|
| 2020/0119748 A1* | 4/2020 | Lucarelli | H03M 13/11 |
| 2021/0194507 A1* | 6/2021 | Delfosse | G06N 10/00 |
| 2021/0224150 A1* | 7/2021 | Zheng | G06F 30/327 |
| 2021/0232963 A1* | 7/2021 | Gimeno-Segovia | G06N 10/70 |
| 2021/0264310 A1* | 8/2021 | Gottesman | G06N 10/00 |
| 2022/0012621 A1* | 1/2022 | Gesek | G06F 7/57 |
| 2022/0269963 A1* | 8/2022 | Delfosse | G06F 16/9024 |

OTHER PUBLICATIONS

He-Liang Huang, Dachao Wu, Daojin Fan, Xiaobo Zhu; Superconducting Quantum Computing: A Review; arXiv:2006. 10433v3 [quant-ph]; Science China Information Sciences 63, 180501; 2020 (Year: 2020).*
Notice of Allowance in Australian Appln. No. 2021281270, dated Jul. 26, 2023, 3 pages.
Office Action in Australian Appln. No. 2021281270, dated May 26, 2023, 3 pages.
Office Action in European Appln. No. 21733671.8, mailed on Aug. 23, 2023, 11 pages.
Bialczak et al., "1/f Flux Noise in Josephson Phase Qubits," CoRR, Submitted on Aug. 2007, arXiv:0708.2125, 4 pages.
Boixo et al., "Characterizing Quantum Supremacy in Near-Term Devices" Submitted on Apr. 2017, arXiv:1608.00263v3, 23 pages.
Bylander et al., "Noise spectroscopy through dynamical decoupling with a superconducting flux qubit," Nature Physics, May 8, 2011, 7:565-570.
Christensen et al., "Anomalous Charge Noise in Superconducting Qubits," Submitted on May 2019, arXiv:1905.13712v1, 10 pages.
Christensen et al., "Measuring charge and flux noise correlations with a superconducting qubit." *APS March Meeting Abstracts.* vol. 2019, 2019, 1 page (Abstract Only).
Endo et al., "Practical quantum error mitigation for near-future applications," Submitted on May 2018, arXiv:1712.09271v2, 20 pages.
Gonzalo et al., "Dynamical decoupling noise spectroscopy," CoRR, Submitted on Jun. 2011, arXiv:1106.3463, 5 pages.
International Preliminary Report on Patentability in International Appln. No. PCT/US2021/034616, mailed on Dec. 8, 2022, 13 pages.
International Search Report and Written Opinion in International Appln. No. PCT/US2021/034616, mailed on Oct. 27, 2021, 19 pages.
Knill et al., "Randomized benchmarking of quantum gates." Submitted on Jul. 2007, arXiv:0707.0963v1, 13 pages.
Leibfried, Dietrich, et al. "Toward Heisenberg-limited spectroscopy with multiparticle entangled states." Science 304.5676, Jun. 2004, 1476-1478.
Medford et al., "Scaling of dynamical decoupling for spin qubits," Submitted on Mar. 2012, arXiv:1108.3682v2, 4 pages.
Norris et al., "Qubit Noise Spectroscopy for Non-Gaussian Dephasing Environments," Phys. Rev. Lett., Apr. 14, 2016, 116:150503.
Paz-Silva et al., "Multiqubit spectroscopy of Gaussian quantum noise." *Physical Review A* 95.2, Feb. 2017:022121, 28 pages.
Sendelbach, "Investigations of 1/f flux noise in superconducting quantum circuits," Disertation for the degree of Doctor of Philosophy, University of Wisconsin-Madison, Dec. 19, 2012, 123 pages.
Song et al., "Observation of multi-component atomic Schrodinger cat states of up to 20 qubits," Submitted on May 2019, arXiv:1905.00320v1, 10 pages.
Szańkowski et al., "Environmental noise spectroscopy with qubits subjected to dynamical decoupling," CoRR, Submitted on May 2017, arXiv:1705.02262v1, 37 pages.
Yoshilhara et al., "Decoherence of flux qubits due to 1/f flux noise," CoRR, Submitted on Jun. 2006, arXiv:0606481v2, 4 pages.
Zhou et al., "Achieving the Heisenberg limit in quantum metrology using quantum error correction." Nature communications 9.1, Jan. 2018:78, 11 pages.
Office Action in Canada Appln. No. 3,180,752, mailed on May 23, 2024, 5 pages.

* cited by examiner

CHARACTERIZATION OF TIME-CORRELATED QUANTUM ERRORS THROUGH ENTANGLEMENT

CROSS-REFERENCE TO RELATED APPLICATIONS

This application is a U.S. National Stage of International Application No. PCT/US2021/034616, filed May 27, 2021, which claims the benefit of U.S. Provisional Application No. 63/032,459, filed May 29, 2020, the contents of which are hereby incorporated by reference.

BACKGROUND

Quantum computers may be able to perform computations that cannot be performed by classical computers, such as efficient prime factorization. At the same time, the performance of quantum computers can be degraded by environmental noise that affects the fidelity of the quantum state of the quantum computer.

SUMMARY

The performance of quantum computers is limited by time-dependent or time-correlated quantum errors, e.g., quantum error characteristics that change over time (such as 1/f noise or quantum gate control drift). Measuring these time-correlated quantum error characteristics provides an understanding of the scope of feasible quantum computation and informs decisions about fault-tolerant error correction schemes given the noisiness of the system.

The subject matter of the present disclosure offers a technique for measuring quantum error characteristics by using highly entangled quantum states of the quantum computer that are collectively sensitive to quantum error. For example, N qubits of the quantum computer can be initialized in a Greenberger-Horne-Zeilinger (GHZ) state (a so-called "Schrodinger cat state"), and when this highly-entangled state is evolved over time, there is an N-fold amplification of the quantum error through spatial entanglement. As a result, less time is needed to measure and characterize the quantum error, and more accurate diagnosis of error can be achieved with the same amount of calibration time. The measured quantum error can be fit to a quantum error model, e.g., a model that characterizes random digital phase errors and bitflip errors such as a Pauli error model. This efficient measurement of the quantum error enables high time-resolution characterization of drift and 1/f noise and rapid appraisal of fitness and fault-tolerance for the quantum computer.

Aspects of the subject matter of the present disclosure include methods of operating a quantum computer, where the methods include initializing N qubits of the quantum computer in a highly entangled state selected to amplify quantum errors (e.g., a Greenberger-Horne-Zeilinger (GHZ) state); accumulating quantum errors in the highly entangled state; and measuring the accumulated errors.

In some approaches, the methods include repeating a sequence of the initializing, the accumulating, and the measuring; and obtaining an ensemble average of the accumulated errors for the repeated measuring. The repeated sequence of measuring can include a sequence of measuring parity oscillations of the highly entangled state for a sequence of phase angles $\phi$, e.g., an incremental sequence of phase angles $\phi$ or a randomized sequence of phase angles $\phi$. Each measurement can include applying an analyzing pulse for the phase angle $\phi$ to each of the N qubits, and may further include applying a dynamical decoupling pulse series (such as a CPMG pulse series) after each analyzing pulse to mitigate the dominant errors.

In some approaches, the methods include fitting a quantum error model, such as a Pauli error model, to the ensemble average of the accumulated errors. For example, the methods can include obtaining a power spectrum of the parity oscillations as a function of phase frequency $\omega_\phi$ conjugate to phase angle $\phi$, and then fitting of Pauli phase error probability $\rho_z$ and Pauli bit-flip error probability $\rho_x$ to the power spectrum of the parity oscillations.

In some approaches, the methods include selecting a quantum error correction scheme corresponding to the fitted quantum error model. The methods can further include performing, by the quantum computer, a computational process using the selected quantum error correction scheme. Alternatively or additionally, the methods can include evaluating, based on the fitted quantum error model, a fitness of the quantum computer for a selected computational process Further aspects of the subject matter of the present disclosure include systems for operating a quantum computer, where the systems include one or more processors; one or more I/O devices coupled to the one or more processors and configured to send control signals to and receive readout signals from the quantum computer; and one or more memories having stored thereon computer readable instructions configured to cause the one more processors and the one or more I/O devices to carry out any of the aforementioned methods on the quantum computer.

Further aspects of the subject matter of the present disclosure include transitory and non-transitory computer readable media storing instructions for execution by one more or more computers configured to send control signals to and receive readout signals from a quantum computer, the instructions causing the one or more computers to carry out any of the aforementioned methods on the quantum computer Various features and advantages of the foregoing subject matter are described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

Time-correlated quantum gate errors can be detrimental to large-scale quantum computation based on fault-tolerant error correction and can degrade the performance of most quantum algorithms. The present subject matter provides methods, systems, and computer programs for achieving high-efficiency measurement and characterization of time-correlated gate errors by using quantum entanglement across many qubits.

In general, measurement precision scales with time and space. In the case of time-correlated signals, is may not be preferable to scale measurements with time, because the longer each measurement takes, the lower the maximum measurable frequency becomes (via the Nyquist sampling theorem). It is therefore appropriate to increase measurement precision/efficiency by using more sensitive probes.

Highly-entangled states, such as Greenberger-Horne-Zeilinger (GHZ) states (so-called "Schrodinger cat" states) offer high sensitivity to collective error such as dephasing. GHZ states are commonly employed in quantum sensing and metrology, but in these fields, the sensitivity of these states to environmental noise is considered to be a disadvantage, as the sensitivity corrupts the measurement of the specific non-environment signal that is being measured via quantum sensing/metrology. On the other hand, in the present context, the sensitivity of highly-entangled states such as GHZ states provides for more sensitive and efficient measurement of environmental noise for a quantum computer system. Other examples of highly entangled states include GHZ-like states, cluster states and cluster-like states. While the following description relates to the use of GHZ states, it will be appreciated that can alternatively be applied to other highly-entangled states.

Figure 1:
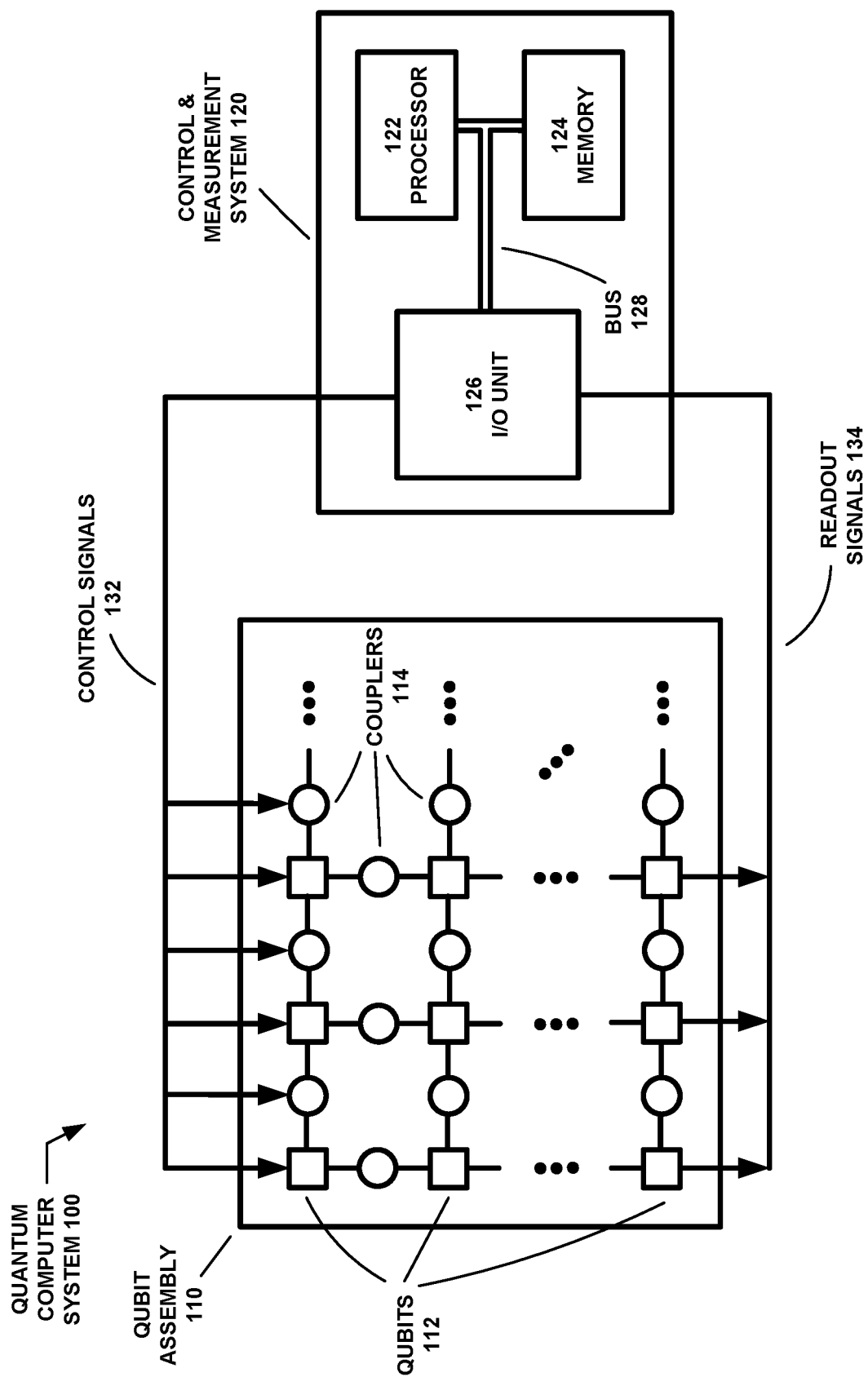
FIG. 1 is a schematic depiction of an exemplary quantum computer system.

With reference now to FIG. 1, a block diagram of a quantum computer system 100 is depicted. This is a schematic depiction of general features of a quantum computer system and is not intended to be limiting. Generally speaking, a quantum computer system 100 includes a qubit assembly 110, which comprises a set of qubits 112. Each qubit can be, e.g., a two-level quantum system having levels representing logical values of 0 and 1; examples of these two-level quantum systems include superconducting transmon states in a superconducting quantum computer, hyperfine atomic states in an atomic quantum computer, and nuclear spin states in an NMR quantum computer. While the qubits 112 are depicted in FIG. 1 as arranged in a rectangular array, this is a schematic depiction and is not intended to be limiting.

The qubit assembly 110 also generally includes adjustable coupling elements 114 to allow for quantum gate operations between coupled qubits. In the schematic depiction of FIG. 1, each qubit 112 is adjustably coupled to each of its four adjacent qubits by means of these couplers 114. Again, this is a schematic arrangement of qubits and couplers and other arrangements are possible, including arrangements that are non-rectangular, arrangements that allow for coupling between non-adjacent qubits, and arrangements that include adjustable coupling between more than two qubits.

In general, a quantum processing algorithm proceeds by initializing the qubits in a selected initial state and then applying a sequence of quantum gate operations to the qubits, which can include one-qubit gate operations such as X, Y, Z, or Hadamard gates; two-qubit gate operations such as CX, CZ, and SWAP; and gate operations involving three or more qubits such as Toffoli gates. The gate operations can be carried out by applying various control signals 132 to the qubits 112 and to the couplers 114; these might include, for example, RF or microwave pulses in an NMR or superconducting quantum computer system, or optical pulses in an atomic quantum computer system. At the conclusion of a quantum processing algorithm, the final states of the qubits can be measured using a quantum observable such as Z, with readout signals 134 that, again, might be RF, microwave, or optical signals depending on the physical scheme for the quantum computer. For illustrative simplicity in FIG. 1, the control signals and readout signals are depicted as addressing only selected elements of the qubit assembly (i.e., the top and bottom rows), but these control and readout signals can address every element in the qubit assembly.

The quantum computer system 100 generally includes a control and measurement system 120 that can include one or more classical (i.e., non-quantum) processors 122, one or more memories 124, and one or more I/O units 126 connected by one or more data buses 126. This control and measurement system can be programmed to send a selected sequence of control signals 132 to the qubit assembly (e.g., to carry out a selected series of quantum gate operations), and to receive a sequence of readout signals 134 from the qubit assembly (e.g., to carry out a selected series of measurements). Thus, for example, the one or more I/O units 126 can include D/A converters, A/D converters, and RF/microwave/optical signal generators, transmitters, and receivers, as appropriate for the physical scheme for the quantum computer.

Figure 2:
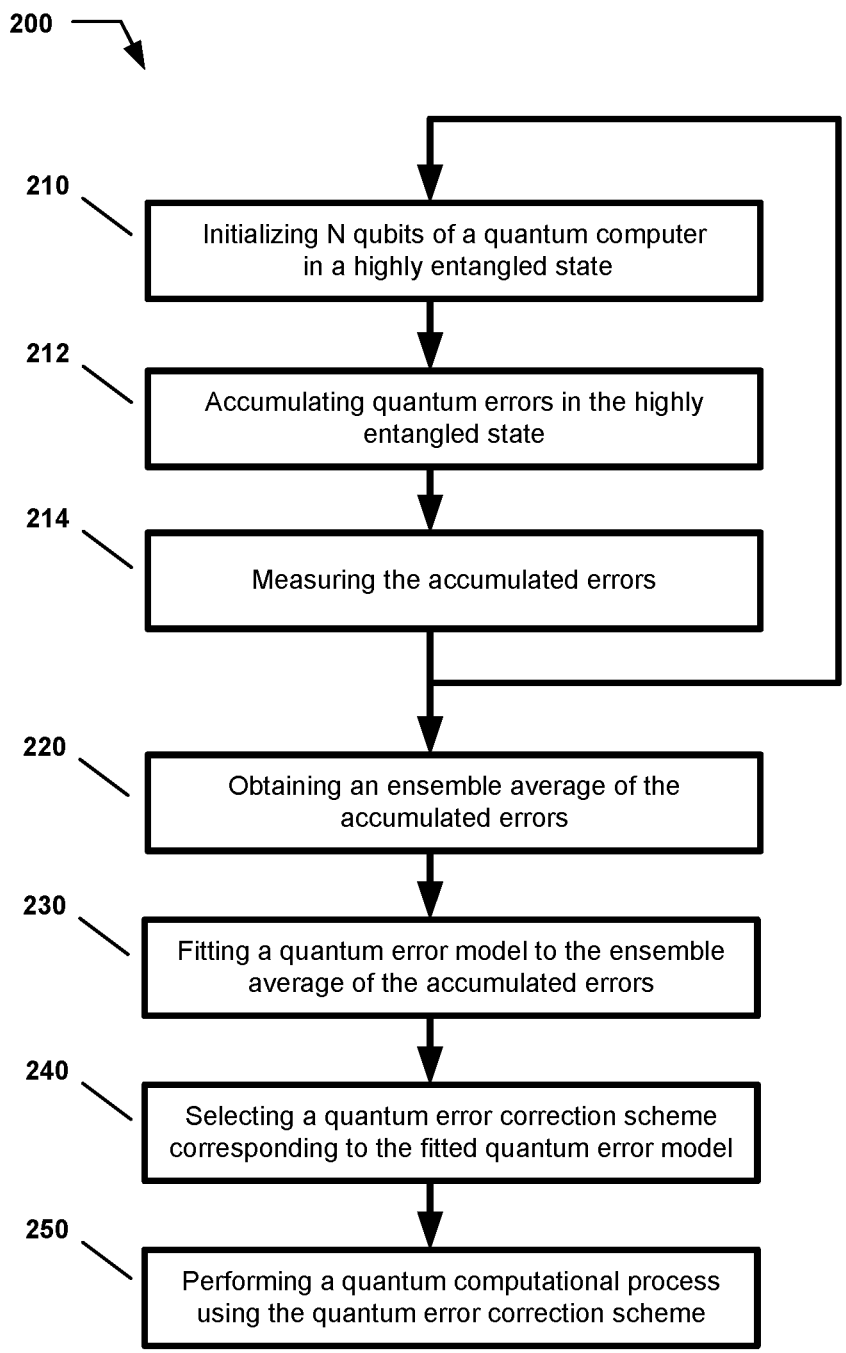
FIG. 2 is a flow diagram that that illustrates an example of a process of characterizing quantum errors using highly entangled states of a quantum computer.
Figure 3:
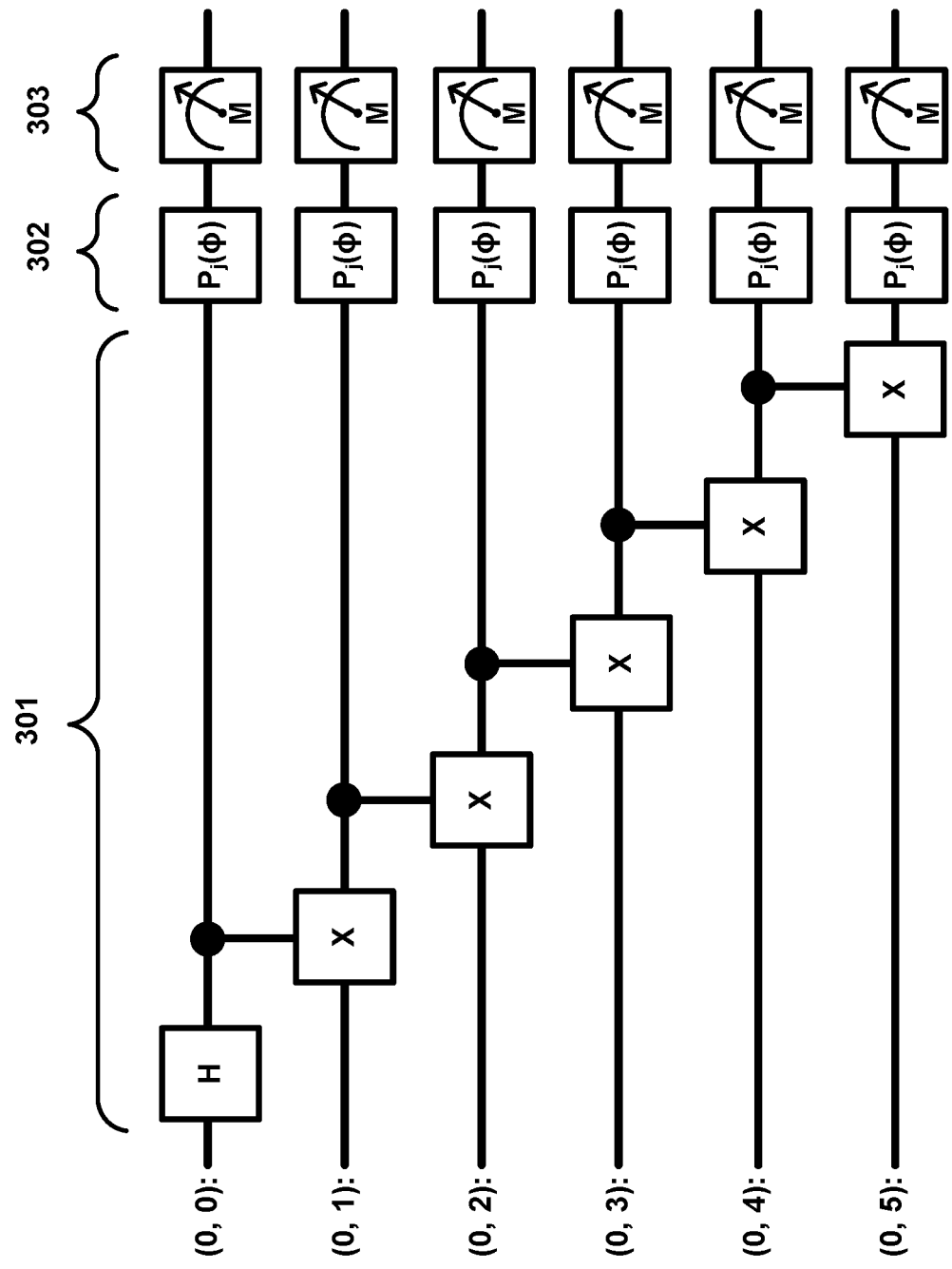
FIG. 3 is an example of preparation and measurement of a highly entangled quantum state of a quantum computer.

With reference now to FIG. 2, a flow diagram is depicted that illustrates an example of a process 200 of characterizing quantum errors using highly entangled states of a quantum computer system. The process 200 includes step 210—initializing N qubits of a quantum computer in a highly entangled state. For example, with the quantum computer system 100 of FIG. 1, control signals 132 can be used to initialize N qubits of the qubit assembly 110 in a highly entangled state. The N qubits could constitute the entirety of the qubits in the qubit assembly 110, or it could constitute a selected subset of qubits in the qubit assembly. In some approaches, the highly entangled state is a Greenberger-Horne-Zeilinger (GHZ) state, i.e., an equal superposition of all qubits in state 0 and all qubits in state 1. A GHZ state can be prepared with, for example, the series of Hadamard and controlled-NOT (CX) gates that are shown in circuit stage 301 in the quantum circuit of FIG. 3 for an example where N=5. Other suitable sequences of one- and two-qubits gates can be used to prepare the GHZ state, depending on the gates that are available for the physical scheme of the quantum computer.

The process 200 further includes step 212—accumulating quantum errors in the highly entangled state. This can include, for example, waiting for some period of time after final preparation of the highly entangled state before beginning measurement of the qubits, so that quantum errors due to environmental noise can accumulate. Alternatively or additionally, the quantum errors due to environmental noise can accumulate while the quantum computer is being initialized in the highly entangled state, e.g. during the series of gate operations that prepare the highly entangled state, such as the Hadamard and CX gate operations 301 preparing a GHZ state as in FIG. 3.

The process 200 further includes step 214—measuring the accumulated errors. For example, with the quantum computer system 100 of FIG. 1, readout signals 134 can be collected to measure the state of each qubit in the highly entangled state to observe the environmental noise that has accumulated.

In one approach, the measuring of the accumulated errors includes measuring parity oscillations for the quantum computer. For example, after the system has been prepared in the GHZ state, e.g., with the Hadamard and CX gates 301 of FIG. 3, the measurement can proceed by applying an analyzing pulse $P_j(\phi)$ to each of the qubits in the prepared GHZ state (as shown as circuit stage 302 of FIG. 3) and then measuring the Z observable for each of the qubits (as shown in circuit stage 303 of FIG. 3). Each analyzing pulse is a Bloch rotation that can be expressed in the form $$P_j(\phi)\exp\left(i\frac{\pi}{4}(X_j\cos\phi + Y_j\sin\phi)\right),$$

where $X_j$ and $Y_j$ are Pauli operators for the jth qubit, and $\phi$ is a selected phase angle for the parity oscillation measurement. This is equivalent to measuring the following expectation value for $0<\phi<2\pi$, where $\phi$ may be correlated or uncorrelated with t:

$$f(\phi)=Tr(\hat{P}(\phi)\rho\hat{P}^\dagger(\phi)Z^{\otimes N}) \quad (1)$$

where $\rho$ is the density matrix for the qubit quantum ensemble that has actually been prepared (representing the pure GHZ state with the addition of quantum errors and environmental noise), $\hat{P}(\phi)$ is the analyzing pulse with phase angle $\phi$ applied to all qubits, and $Z_{\otimes N}$ is the tensor product of the Pauli Z matrices for all qubits. In some approaches, a dynamical decoupling pulse series, such as a Carr-Purcell-Meiboom-Gill (CPMG) pulse series, can be applied after the analyzing pulse to improve the measurement of $Z^{\otimes N}$ by correcting for dephasing errors.

The steps of initializing 210, accumulating quantum errors 212, and measuring 214 can be sequentially repeated many times to increase the statistical sample size. For example, if each measuring step is a measurement of parity oscillation for a selected phase angle $\phi$ as described above, the initializing, accumulating, and measuring can be repeated multiple times for the selected phase angle $\phi$, and/or the initializing, accumulating, and measuring can be repeated for multiple values of the phase angle $\phi$ exploring the range of phase angles $0<\phi<2\pi$. In one approach, the initializing, accumulating, and measuring are repeated for a sequence of phases that is an incremental sequence, so that $\phi$ increases with time during the repetitions (i.e., the phase measurements are time-ordered). In another approach, the initializing, accumulating, and measuring are repeated for a randomized sequence of phases, so that $\phi$ is not time-ordered.

For approaches in which the initializing, accumulating, and measuring are repeated, the process 200 further includes step 220—obtaining an ensemble average of the accumulated errors. Thus, the repeated measurements are compiled to increase the statistical sample size and, for approaches that involve measurement of parity oscillations, to measure the parity oscillations for a range of phase angles $0<\phi<2\pi$.

The obtaining of the ensemble average can include obtaining a power spectrum of the parity oscillations as a function of phase frequency $\omega_\phi$ conjugate to phase angle $\phi$. The power spectrum can reveal specific characteristics of the quantum errors that affect the quantum computer, such as phase errors and bit-flip errors. Consider that a pure GHZ state unaffected by environmental noise has a power spectrum as a function of phase frequency $\omega_\phi$ that can be expressed as follows:

$$\mathcal{F}(\langle\psi_{GHZ}|\hat{Z}_j\hat{P}(\phi)\hat{Z}^{\otimes N}\hat{P}(\phi)|\psi_{GHZ}\rangle) = \mathcal{F}\left(\frac{1}{2}\left(e^{-iN(\phi-\frac{\pi}{2})}\hat{Z}_j + e^{iN(\phi-\frac{\pi}{2})}\hat{Z}_j\right)\right) \quad (2)$$

$$= \mathcal{F}\left(\cos\left(N\left(\phi-\frac{\pi}{2}\right)\right)\right)$$

-continued $$= \pi\left(e^{-iN\frac{\pi}{2}}(\omega_\phi + N)\right)$$

In other words, the parity oscillation of a pure GHZ state is a cosine wave of amplitude 1 and frequency N, for a GHZ state of N entangled qubits.

In the presence of environmental noise introducing quantum errors such as phase errors and bit-flip errors, phase errors contribute to the primary mode at frequency $\omega_\phi=N$ by dampening that primary mode $$\mathcal{F}\left(\langle\psi_{GHZ}|\bigotimes_{j\in K}\hat{Z}_j\hat{P}^\dagger(\phi)\hat{Z}^{\otimes N}\hat{P}(\phi)\bigotimes_{j\in K}\hat{Z}_j|\psi_{GHZ}\rangle\right) = \quad (3)$$

$$(-1)^K\pi\left(e^{-iN\frac{\pi}{2}}\delta(\omega_\phi - N) + e^{iN\frac{\pi}{2}}\delta(\omega_\phi + N)\right)$$

(with $Z_j$ representing the effect of a phase error on qubit j); whereas bit-flip errors contribute to lower frequency modes at frequencies $\omega_\phi=N-2, N-4$, etc.

$$\mathcal{F}\left(\langle\psi_{GHZ}|\bigotimes_{j\in K}\hat{X}_j\hat{P}^\dagger(\phi)\hat{Z}^{\otimes N}\hat{P}(\phi)\bigotimes_{j\in K}\hat{X}_j|\psi_{GHZ}\rangle\right) = \quad (4)$$

$$\mathcal{F}\left(\frac{1}{2}\left(e^{i(N-2K)(\phi-\frac{\pi}{2})} + e^{-i(N-2K)(\phi-\frac{\pi}{2})}\right)\right) =$$

$$\pi\left(e^{-i(N-2K)\frac{\pi}{2}}\delta(\omega_\phi - (N-2K)) + e^{i(N-2K)\frac{\pi}{2}}\delta(\omega_\phi + (N-2K))\right)$$

(with $X_j$ representing the effect of a bit-flip error on qubit j). The cumulative result is that the power spectrum of the parity oscillation of a GHZ state can have the following form, revealing characteristic signatures of both phase error and bit-flip error:

$$F(\omega_\phi) = \alpha_N\left(e^{-iN\frac{\pi}{2}}\delta(\omega_\phi - N) + e^{iN\frac{\pi}{2}}\delta(\omega_\phi + N)\right) + \quad (5)$$

$$\sum_{j=N-2,N-4,\ldots}\alpha_j\left(e^{-ij\frac{\pi}{2}}\delta(\omega_\phi - j) + e^{ij\frac{\pi}{2}}\delta(\omega_\phi + j)\right)$$

where the coefficient an of the primary mode reveals phase dampening error rates for the quantum computer system, and the coefficients $\alpha_{N-2}, \alpha_{N-4}$, etc., of the lower-frequency modes reveal bit-flip error rates for the quantum computer system.

Figure 4:
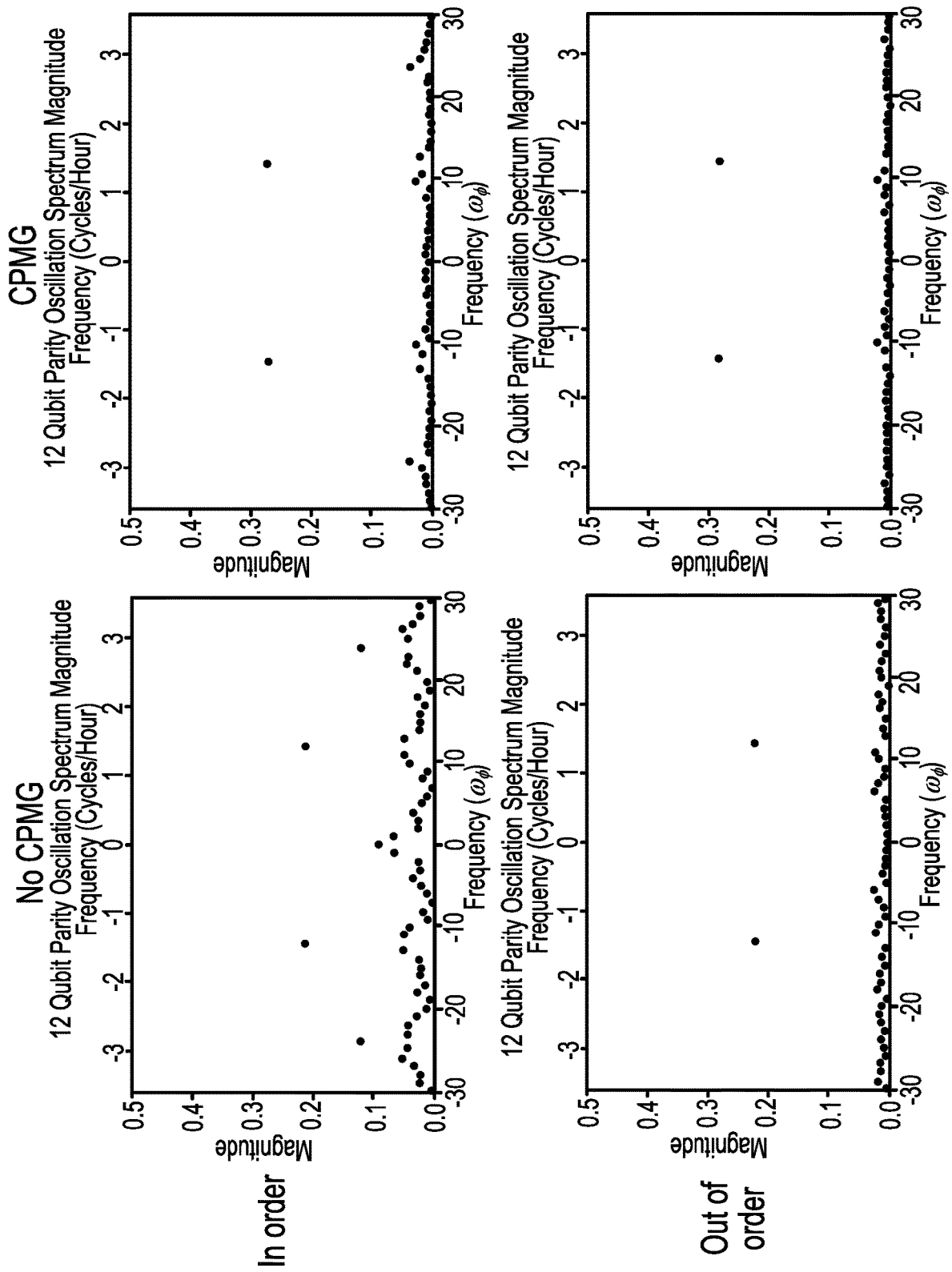
FIG. 4 depicts exemplary power spectra for parity oscillations of a highly entangled quantum state of a quantum computer.

With reference now to FIG. 4, experimental data is presented for parity oscillations in a GHZ state of 12 qubits. The four panels depict power spectra of the parity oscillation as a function of phase frequency $\omega_\phi$ for experiments with and without time-ordering of the phases for the analyzing pulses $\hat{P}(\phi)$ (as discussed above), and with and without the use of CPMG pulse sequences after each analyzing pulse (as discussed above). Each panel shows a dominant parity oscillation mode at $\omega_\phi=\pm N(=\pm 13$ in this instance). Using out-of-order phases can have the effect of whitening time-dependent error, while using CPMG pulse sequences can have the effect of correcting for dephasing errors. Thus, the similarity between the two power spectra collected with CPMG pulse sequences suggests that most of the difference between the two non-CPMG experiments is attributable to dephasing error.

Returning to FIG. 2, the process 200 further includes step 230—fitting a quantum error model to the ensemble average of the accumulated errors. For example, the quantum errors that accumulate in the GHZ state may be described in terms of a digital error model such as a Pauli error model, in which the environmental noise that afflicts the qubit assembly is modeled as random insertions of single-qubit Z gates (leading to phase error) and/or random insertions of single-qubit X or Y gates (leading to bit flip error). As discussed above, the parameters of such a model (e.g., a phase error probability $p_z$ and bit-flip error probability $p_x$) are manifested in the power spectrum of the parity oscillation of a GHZ state. Thus, a quantum error model such as a Pauli error model can be fitted to the ensemble average of the accumulated errors by fitting the model to the power spectrum of the parity oscillation.

Figure 5:
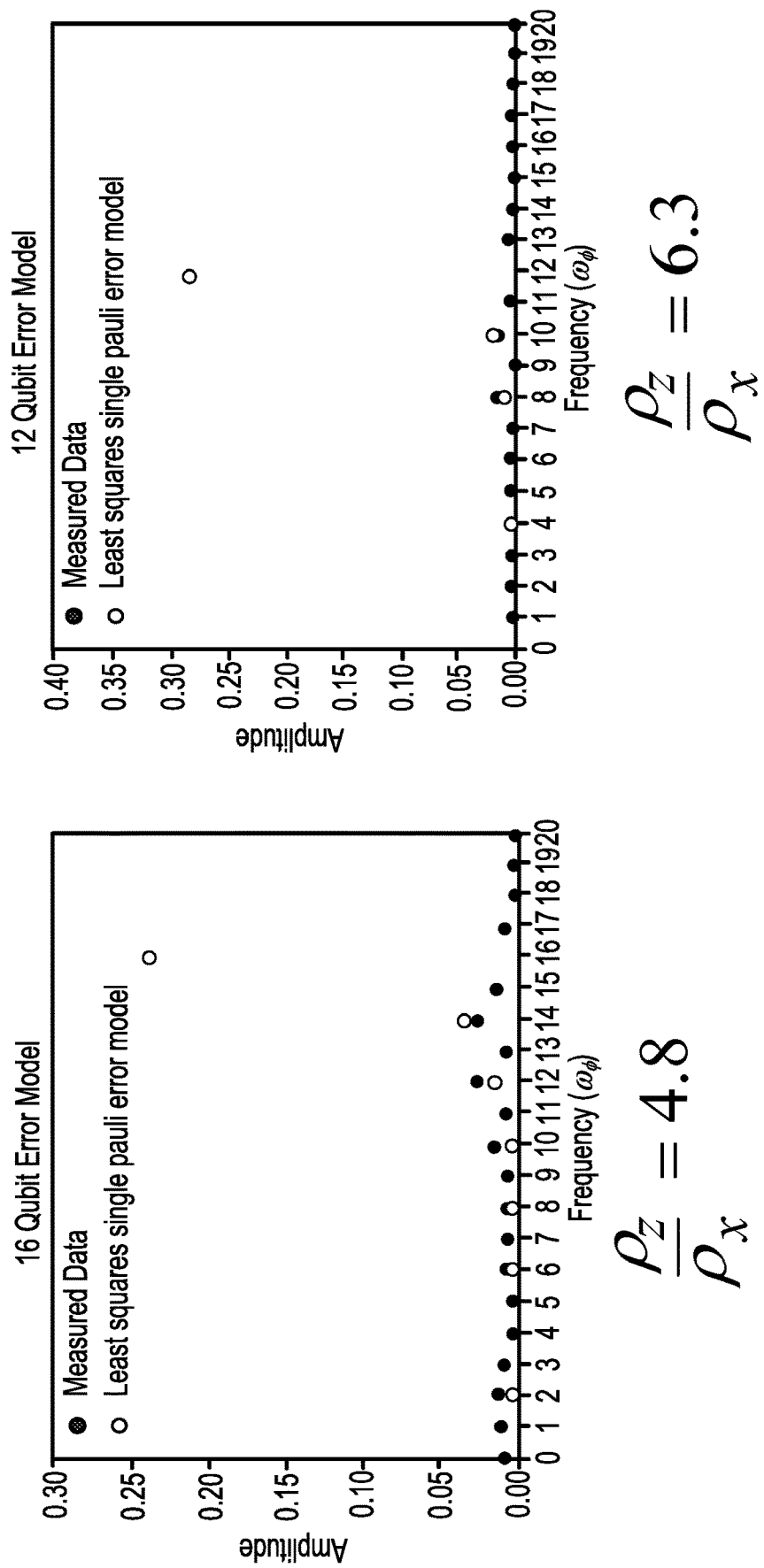
FIG. 5 depicts exemplary fittings of quantum error models to power spectra for parity oscillations of a highly entangled quantum state of a quantum computer.

FIG. 5 presents two examples of such fittings to experimentally-obtained power spectra for parity oscillations of a GHZ state. At left, a parity oscillation power spectrum for an N=16 GHZ state is fitted via least squares to a Pauli error model with a Pauli Z to Pauli X error ratio of 4.8. At right, a parity oscillation power spectrum for an N=12 GHZ state is fitted via least squares to a Pauli error model with a Pauli Z to Pauli X error ratio of 6.3.

The process 200 of FIG. 2 further includes step 240—selecting a quantum error correction scheme corresponding to the fitted quantum error model. For example, based on the fitted parameters of the fitted quantum error model, a degree of redundancy for a fault-tolerant error correction scheme can be determined, for example the distance of an error correction code can be determined, and then a quantum algorithm can be modified to use the fault-tolerant error correction scheme with the determined degree of redundancy.

The process 200 of FIG. 2 also may include step 250—performing a quantum computation process using the quantum error correction scheme. For example, having found a fault-tolerant error correction scheme that corresponds to the fitted quantum error model, e.g., having an appropriate degree of redundancy for the computational task at hand, the quantum computational process can be carried out using the determined appropriate degree of redundancy.

Returning to FIG. 1, the control and measurement system 120 provides an example of a classical (i.e., non-quantum) computer system that can be used to perform various operations on the qubit assembly 110 as described above. The system 120 includes a processor 122, a memory 124, and an input/output device 126. Each of the components 122, 124, and 126 can be interconnected, for example, using a system bus 128. The processor 122 is capable of processing instructions for execution within the system 120. In some implementations, the processor 122 is a single-threaded processor. In other implementations, the processor 122 is a multi-threaded processor. The processor 122 is capable of processing instructions stored in the memory 124.

The memory 124 stores information within the system 120. In some implementations, the memory 124 includes a computer-readable medium, a volatile memory unit, and/or a non-volatile memory unit. In some approaches, the memory 124 can include storage devices capable of providing mass storage for the system 120, e.g., a hard disk device, an optical disk device, a storage device that is shared over a network by multiple computing devices (e.g., a cloud storage device), and/or some other large capacity storage device.

The input/output device 126 provides input/output operations for the system 120. As discussed above, the input/output device can include D/A converters, A/D converters, and RF/microwave/optical signal generators, transmitters, and receivers, whereby to send control signals 132 to and receive readout signals 134 from the qubit assembly, as appropriate for the physical scheme for the quantum computer. In some implementations, the input/output device 126 can also include one or more network interface devices, e.g., an Ethernet card, a serial communication device, e.g., and RS-232 port, and/or a wireless interface device, e.g., and 802.11 card. In some implementations, the input/output device can include driver devices configured to receive input data and send output data to other external devices, e.g., keyboard, printer and display devices.

Although an example control and measurement system 120 has been depicted in FIG. 1, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method of operating a quantum computer, comprising:
repeatedly performing a plurality of operations, the plurality of operations comprising
initializing N qubits of the quantum computer in a highly entangled state that allows the amplification of quantum errors through coherent phase accumulation,
accumulating quantum errors in the highly entangled state, and
measuring the accumulated errors; and
obtaining an ensemble average of the accumulated errors from repeated performing of the plurality of operations;
wherein the repeated performing of the plurality of operations is completed on a measurement time scale less than a characteristic time scale for drift of quantum errors in the quantum computer.

2. The method of claim 1, wherein the highly entangled state selected to amplify quantum errors is a Greenberger-Horne-Zeilinger (GHZ) state.

3. The method of claim 1, wherein measuring the accumulated errors comprises measuring parity oscillations of the highly entangled state for a sequence of phase angles $\phi$.

4. The method of claim 3, wherein the sequence of phase angles $\phi$ is an incremental sequence of phase angles $\phi$.

5. The method of claim 3, wherein the sequence of phase angles $\phi$ is a randomized sequence of phase angles $\phi$.

6. The method of claim 3, wherein, for each phase angle $\emptyset$ in the sequence of phase angles, measuring parity oscillations includes: applying an analyzing pulse for the phase angle $\phi$ to each of the N qubits.

7. The method of claim 6, wherein for each phase angle $\phi$ in the sequence of phase angles, measuring parity oscillations includes: applying a dynamical decoupling pulse series after the analyzing pulse.

8. The method of claim 7, wherein each of the dynamical decoupling pulse series is a Carr-Purcell-Meiboom-Gill (CPMG) pulse series.

9. The method of claim 3, further comprising:
fitting a quantum error model to the ensemble average of the accumulated errors.

10. The method of claim 9, wherein the quantum error model is a Pauli error model.

11. The method of claim 10, wherein:
the obtaining of the ensemble average includes obtaining a power spectrum of the parity oscillations as a function of phase frequency $\omega_\phi$ conjugate to phase angle $\phi$; and
the fitting of the Pauli error model is a fitting of Pauli phase error probability $\rho_z$ and Pauli bit-flip error probability $\rho_x$ to the power spectrum of the parity oscillations.

12. The method of claim 9, further comprising:
selecting a quantum error correction scheme corresponding to the fitted quantum error model.

13. The method of claim 12, further comprising:
performing, by the quantum computer, a computational process using the selected quantum error correction scheme.

14. The method of claim 9, further comprising:
evaluating, based on the fitted quantum error model, a fitness of the quantum computer for a selected computational process.

15. A system for operating a quantum computer, the system comprising:
one or more processors;
one or more I/O devices coupled to the one or more processors and configured to send control signals to and receive readout signals from the quantum computer; and
one or more memories having stored thereon computer readable instructions configured to cause the one more processors and the one or more I/O devices to carry out operations on the quantum computer, the operations comprising:
repeatedly performing a plurality of operations, the plurality of operations comprising
initializing N qubits of the quantum computer in a highly entangled state that allows the amplification of quantum errors through coherent phase accumulation,
accumulating quantum errors in the highly entangled state, and
measuring the accumulated errors; and
obtaining an ensemble average of the accumulated errors from repeated performing of the plurality of operations;
wherein the repeated performing of the plurality of operations is completed on a measurement time scale less than a characteristic time scale for drift of quantum errors in the quantum computer.

16. The system of claim 15, wherein the quantum computer is a superconducting quantum computer, an NMR quantum computer, a trapped ion quantum computer, or an atomic quantum computer.

17. The system of claim 15, further comprising: the quantum computer.

18. A non-transitory computer readable medium storing instructions for execution by one more or more computers configured to send control signals to and receive readout signals from a quantum computer, the instructions causing the one or more computers to carry out operations on the quantum computer, the operations comprising:
repeatedly performing a plurality of operations, the plurality of operations comprising
initializing N qubits of the quantum computer in a highly entangled state that allows the amplification of quantum errors through coherent phase accumulation,
accumulating quantum errors in the highly entangled state, and
measuring the accumulated errors; and
obtaining an ensemble average of the accumulated errors from repeated performing of the plurality of operations;
wherein the repeated performing of the plurality of operations is completed on a measurement time scale less than a characteristic time scale for drift of quantum errors in the quantum computer.

* * * * *

UNITED STATES PATENT AND TRADEMARK OFFICE
CERTIFICATE OF CORRECTION

| | | |
|---|---|---|
| PATENT NO. | : 12,182,665 B2 | Page 1 of 1 |
| APPLICATION NO. | : 17/928349 | |
| DATED | : December 31, 2024 | |
| INVENTOR(S) | : Niu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 57 days.

Signed and Sealed this
Twenty-fourth Day of June, 2025

Coke Morgan Stewart
*Acting Director of the United States Patent and Trademark Office*